US008256692B2

(12) United States Patent
Knowles (10) Patent No.: US 8,256,692 B2
(45) Date of Patent: Sep. 4, 2012

(54) POSITIONING APPARATUS FOR SLUDGE DISTRIBUTING HOSE

(75) Inventor: James T. Knowles, Washington, IA (US)

(73) Assignee: Bazooka Farmstar, Inc., Washington, IA (US)

( * ) Notice: Subject to any disclaimer, the term of this patent is extended or adjusted under 35 U.S.C. 154(b) by 315 days.

(21) Appl. No.: 12/582,888

(22) Filed: Oct. 21, 2009

(65) Prior Publication Data

US 2011/0089269 A1    Apr. 21, 2011

(51) Int. Cl.
  B05B 3/00    (2006.01)
  B05B 3/18    (2006.01)
  B65H 75/00   (2006.01)
(52) U.S. Cl. ......................................... 239/195; 239/745
(58) Field of Classification Search ................... 239/195, 239/745; 56/188, 212
  See application file for complete search history.

(56) References Cited

U.S. PATENT DOCUMENTS

| | | | |
|---|---|---|---|
| 3,221,482 A * | 12/1965 | Cowling | 56/15.8 |
| 6,116,275 A | 9/2000 | George, Jr. | |
| 6,427,612 B1 | 8/2002 | Huffman | |
| 7,509,977 B2 | 3/2009 | Huffman | |

FOREIGN PATENT DOCUMENTS

DE    2530554 A  *  4/1976

OTHER PUBLICATIONS

Bazooka Farmstar Brochure, Mar. 1, 2009, 2 pages.

* cited by examiner

*Primary Examiner* — Christopher J. Novosad
(74) *Attorney, Agent, or Firm* — Greer, Burns & Crain, Ltd.

(57) ABSTRACT

Apparatus for positioning and maneuvering a sludge, or manure, distributing hose used in fertilizing a field includes a first frame adapted for coupling to a three-point tractor hitch and a second frame pivotally coupled to an aft portion of the first frame. Attached to and disposed aft of the second frame is a horizontally oriented, rotatable wheel assembly adapted to engage, lift and position the hose and to provide for changes in the direction of the hose as it is pulled through a field during fertilizing. The wheel assembly is horizontally and vertically pivotable about the first frame for respectively facilitating maneuvering of the hose in a field and for raising the wheel assembly for transport. A locking mechanism is provided for engaging and preventing rotation of the wheel assembly when desired. Hydraulic cylinders connected to the tractor's hydraulic system allow for changing the configuration of the apparatus.

17 Claims, 11 Drawing Sheets

POSITIONING APPARATUS FOR SLUDGE DISTRIBUTING HOSE

FIELD OF THE INVENTION

This invention relates generally to agricultural fertilizing and is particularly directed to tractor-towed apparatus for engaging and positioning a hose for use in spreading sludge, or manure, on a field.

BACKGROUND OF THE INVENTION

Animals are raised on farms for various reasons. In many cases, a primary reason is for the manure that they produce. The manure is a valuable, sometimes an essential, fertilizing agent in the growing of crops. The manure is collected over time and is stored for later application on crop-yielding fields. The manure is typically stored in a pit, or lagoon, located typically close to, and in some cases may be under, the facility in which the animals are housed. The size of the storage pit depends primarily on the number and types of animals which are housed, and may be large enough to hold millions of gallons of manure.

The manure is typically held in a storage pit for several months and is applied in the spring and fall in many farming regions. During fertilizing, the manure is pumped out of the manure pit and is provided via long lengths of hose to various locations on a farm. A tractor is used to pull the manure-laden hose in a back and forth pattern over the fields in spreading the manure on the fields. To access remote locations, a length of hose exceeding one mile may be required. The hose, when filled with sludge, is very heavy and is, thus, difficult to maneuver and position. Spreading the manure involves the towing tractor traversing the entire field, and positioning of the hose to accommodate natural barriers such as water, woods and surface contour. Proper positioning of the sludge hose places great demand not only on the service provider, but also on the equipment involved in manipulating the sludge hose.

The present invention is intended to address the aforementioned problems encountered in the prior art by providing positioning apparatus for a sludge distributing hose which is adapted for secure attachment to the three-point hitch of a tractor, is capable of engaging, maneuvering and lifting the sludge hose, as necessary, and can be raised to a non-use position to facilitate transport to and from the fields to be fertilized.

OBJECTS AND SUMMARY OF THE INVENTION

Accordingly, it is an object of the present invention to facilitate the application of sludge fertilizer to a field.

It is another object of the present invention to provide apparatus adapted for mounting to the three-point hitch of a tractor and which is capable of engaging, lifting and positioning a sludge-filled hose for applying fertilizer to a field.

Yet another object of the present invention is to provide a sludge hose maneuvering apparatus capable of precisely positioning the sludge on-the-go during field fertilizing, is easily attached to and removed from a tractor, can be precisely controlled by the tractor operator while driving the tractor, and can be used as either a pulley in passing the hose or as a fixed curvilinear surface in positioning the hose in the field.

A further object of the present invention is to provide the capability to the operator of a tractor maneuvering a sludge applicator hose in a field to laterally displace the sludge hose from the line of travel of the tractor so that the displaced sludge hose lies outside of the tractor's foot print to avoid the tractor running over the sludge hose as it maneuvers the hose.

The present invention contemplates an apparatus for engaging and positioning a sludge hose in spreading fertilizer on a field, the apparatus comprising a first frame member adapted for mounting to a vehicle; a second frame member pivotally coupled to said first frame member; a curvilinear rotatable member attached to the second frame member and adapted to engage the sludge hose; a first displacement mechanism coupled to the first and second frame members for raising the second frame member, the rotatable member, and the sludge hose above the field; and a second displacement mechanism coupled to the second frame and to the rotatable member for laterally displacing the rotatable member in repositioning the sludge hose.

BRIEF DESCRIPTION OF THE DRAWINGS

The appended claims set forth the novel features which characterize the invention. However, the invention itself, as well as further objects and advantages thereof, is best understood with reference to the following detailed description of a preferred embodiment taken in conjunction with the accompanying drawings, where like reference characters identified like elements throughout the various figures, in which:

DETAILED DESCRIPTION OF THE PREFERRED EMBODIMENTS

Figure 1:
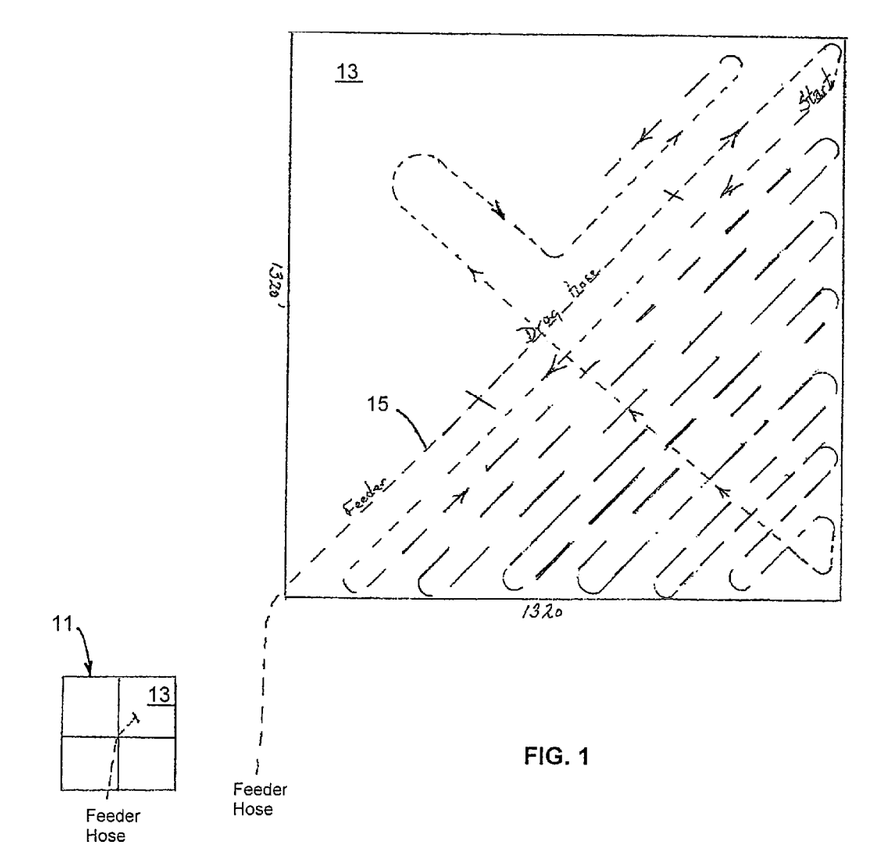
FIGS. 1-4 illustrate uses of the sludge distributing hose positioning apparatus of the present invention in fertilizing a farm field in accordance with the present invention.

Referring to FIGS. 1-4, there are shown illustrations of a farm field and the manner in which the sludge distributing hose positioning apparatus of the present invention is used in fertilizing a farm field. Referring to FIG. 1, there is shown a farm field 13 forming the upper right corner quadrant of a larger farm field 11 as shown in a lower portion of the figure. A tractor towing a sludge distributing hose (neither of which are shown in FIG. 1 for simplicity) traverses a path illustrated by dotted line 15 in depositing sludge fertilizer on the field 13.

In the illustrated example, the tractor enters the lower left hand corner of the field 13 and traverses the field to its upper right hand corner while towing the hose as sludge is discharged from the hose onto the field. When the tractor reaches the upper right hand corner of the field 13, it executes a 180° turn and returns to the lower left hand corner of the field. This pattern is repeated until the lower right hand portion of the field 13 is fertilized and the tractor travels to the upper right hand portion of the field for completing the application of the sludge fertilizer to the field.

Figure 2:
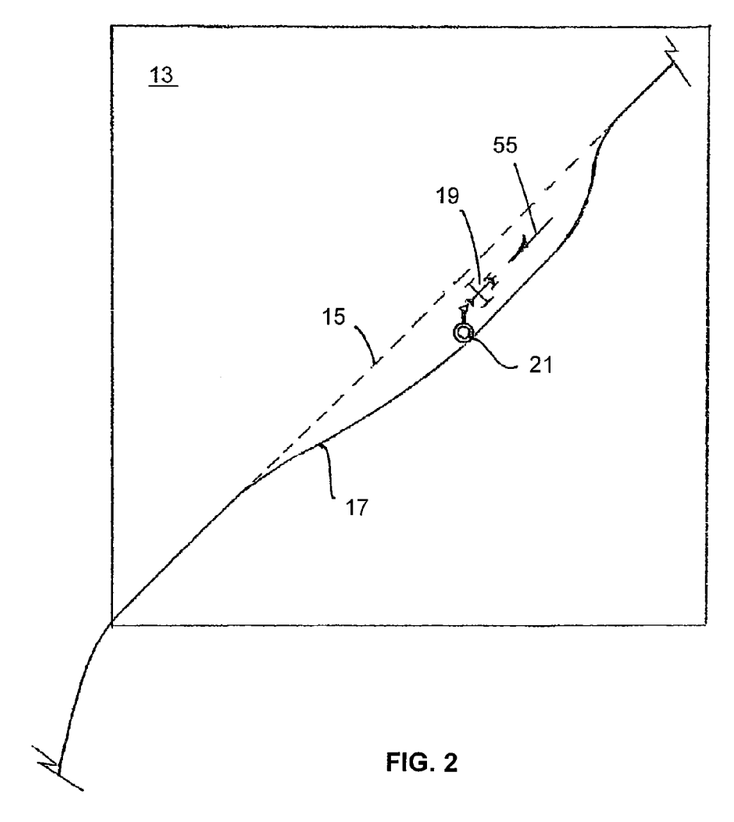

One example of the use of a sludge distributing hose positioning apparatus 21 in accordance with the present invention is illustrated in FIG. 2. In this example, a tractor (not show for simplicity) towing an end of sludge distributing hose 21 has diagonally traversed field 13 from its lower left corner to its upper right corner and has applied sludge fertilizer to the lower right hand portion of the field. As shown in FIG. 2, the sludge distributing hose 17 is being moved in a rightward direction by the hose positioning apparatus 21 which is being pushed in the direction of arrow 55 by tractor 19. This operation involves moving the sludge distributing hose 17 onto the portion of the field 13 which has been fertilized to allow the tractor towing the sludge distributing hose to apply sludge fertilizer to the upper left hand portion of the field without damaging the sludge hose by driving over it. This also eliminates excessive maneuvering by the hose-towing vehicle in removing the sludge hose from the portion of the field to be fertilized which saves time, fuel and results in reduced compaction of the soil by the vehicle during planting.

FIG. 2 also shows a portion of the hose positioning apparatus 21 at an offset angle to the line of travel of tractor 19 which is in the direction of arrow 55. The manner in which the hose positioning apparatus 21 of the present invention positions the sludge distributing hose 17 in a laterally offset manner from the tractor's path is described in detail below. In a preferred embodiment, the maximum angle formed between the hose engaging portion of the hose positioning apparatus 21 and the tractor's path is on the order of 55° giving rise to a lateral offset from the tractor's path on the order of 188 inches, or 15 feet 8 inches. This distance exceeds one-half the maximum width of a tractor having a dual tire drive arrangement. By maintaining the sludge distributing hose in an offset position to the path of travel of the tractor 19, the tractor can more quickly and efficiently move the sludge distributing hose 17 to a desired location by maintaining the hose positioning apparatus 21 in continuous contact with the sludge distributing hose as the hose positioning apparatus moves along a desired track. This eliminates the current practice wherein the tractor and hose positioning apparatus repeatedly engage and displace adjacent portions of the sludge distributing hose in a sequential manner in repositioning extended lengths of the hose.

Figure 3:
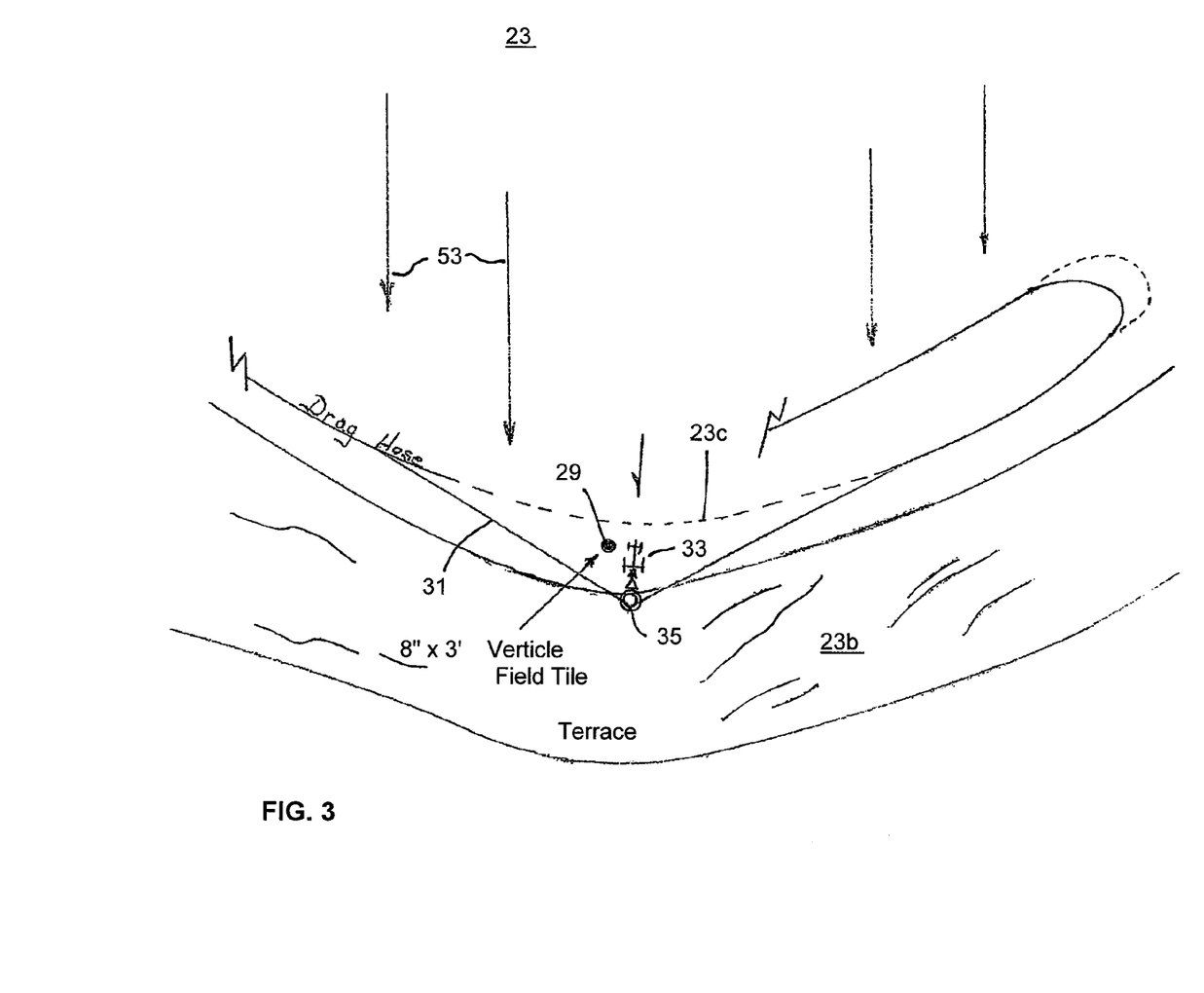

Referring to FIG. 3, there is shown another use of the sludge hose positioning apparatus 35 of the present invention in engaging and moving a sludge distributing hose 31. FIG. 3 shows a farm field 23a bordered on the lower portion thereof by a terrace 23b which is used for water run off. Sludge distributing hose 31 has been dragged over the upper portion of farm field 23a by a tractor (not shown) in fertilizing the upper portion of the field. Field 23a slopes downward in the direction of arrows 53 toward terrace 23b. A vertical field tile, or standpipe, 29 is located in a lower portion of field 23a adjacent terrace 23b to facilitate draining of the field under wet conditions. This type of vertical field tile 29 typically extends on the order of three feet above the soil. The inventive hose positioning apparatus 35 attached to tractor 33 and has engaged and lifted a portion of the sludge hose 31 over vertical field tile 29 and located the hose at, or adjacent to, the boundary between the farm field 23a and terrace 23b. This allows the sludge hose towing tractor to fertilize the lower portion of field 23a adjacent terrace 23b without damaging field tile 29, running over and damaging sludge distributing hose 31 or undergoing excessive maneuvering to avoid the field tile while still being able to access the lower limits of the field.

Figure 4:
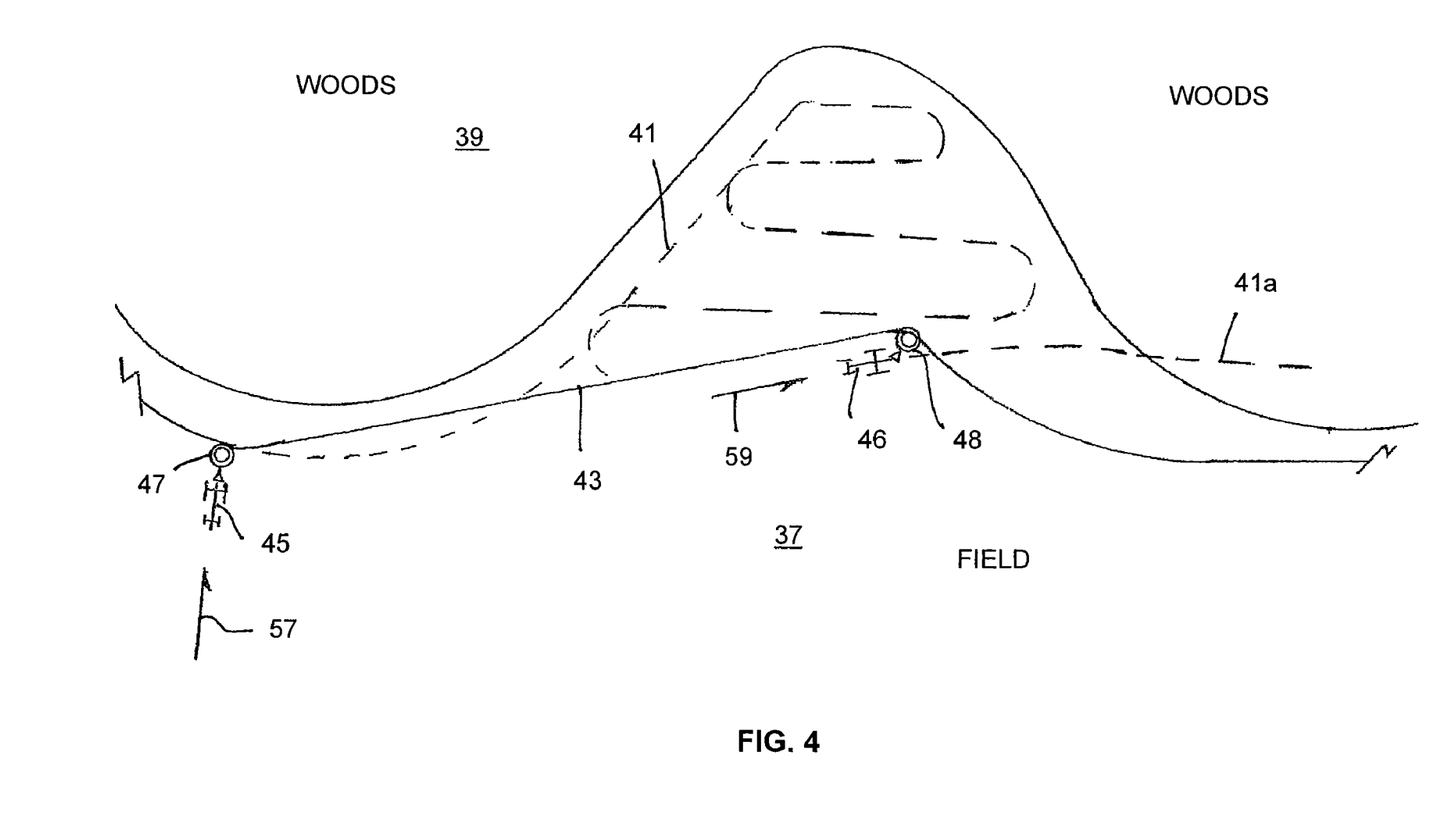

Referring to FIG. 4, there is shown another example of the use of the inventive hose positioning apparatus 48 during fertilization of a farm field 37. In the example of FIG. 4, farm field 37 is bordered on its upper portion by woods and includes an upwardly extending notch portion which extends into the woods. A tractor (not shown) towing sludge fertilizer hose 43 has traversed the path 41 shown in dotted line form for fertilizing the upward extending notch of field 37. The tractor then exits the areas shown in FIG. 4 via path 41a and first and second hose positioning apparatus 47 and 48 respectively connected to first and second tractors 45 and 46 are used to reposition the sludge distributing hose 43 to permit the sludge hose towing tractor to traverse the lower portion of field 37 shown in FIG. 4. The first hose positioning apparatus 47 is shown being pushed upwardly in the direction of arrow 57 for locating the sludge distributing hose on fertilized ground and clearing the unfertilized portion of field 37 to allow the towing tractor to cover the unfertilized portion. Similarly, the second tractor 46 is displacing the second hose positioning apparatus 48 in the direction of arrow 59 to relocate the sludge distributing hose 43 on treated soil and clear untreated ground in perpetration for applying fertilizer to the untreated soil.

Figure 5:
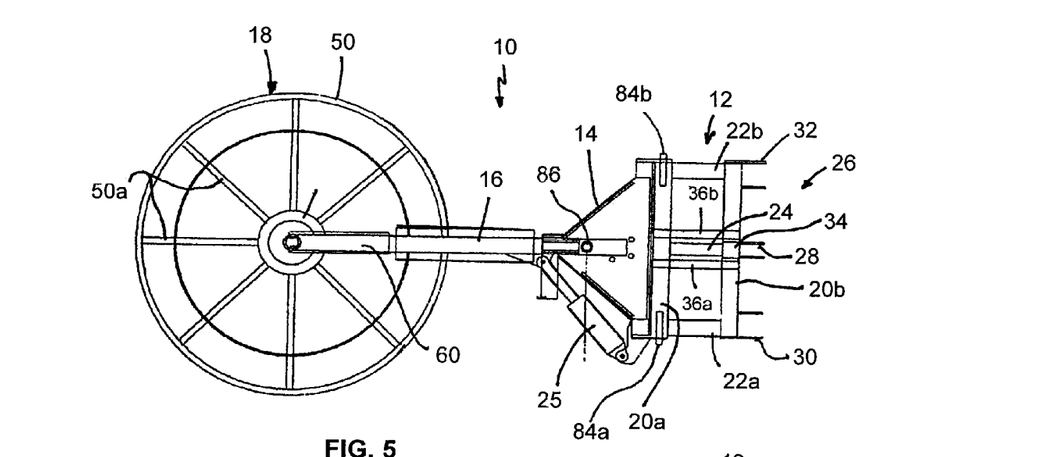
FIG. 5 is a top plan view of a positioning apparatus for a sludge distributing hose in accordance with the principles of the present invention.
Figure 6:
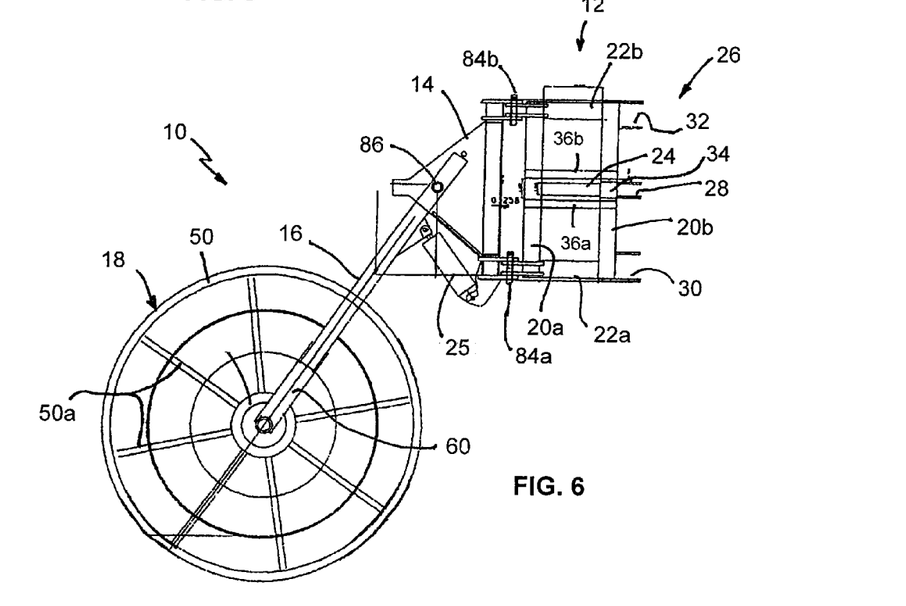
FIG. 6 is a top plan view of the inventive sludge distributing hose positioning apparatus show in FIG. 5, where the hose-engaging wheel assembly has been moved so as to assume nonlinear alignment with the support/attachment frame of the apparatus.

Referring now to FIGS. 5 and 6, a top plan view of the hose positioning apparatus 10 of the present invention is shown and includes a mounting frame 12, a wheel support frame 14, a support arm 16, and a wheel assembly 18. With additional reference to FIG. 8, mounting frame 12 is used to connect the hose positioning apparatus 10 to a tractor 38. In the illustrated exemplary embodiment, the mounting frame 12 includes a forward beam 20a, an aft beam 20b, a first side beam 22a, and a second side beam 22b all of which are rigidly secured to one another to provide a generally rectangular frame. A center beam 24 is rigidly secured to and extends between the forward and aft beams 20a, 20b to provide additional structural support to the mounting frame 12. Exemplary manners of rigidly securing the beams to one another include welding, unitarily forming, fastening, etc. In other exemplary embodiments, mounting frame 12 may include other quantities of beams rigidly secured to one another to form other frame shapes such as, for example, triangular, polygonal, etc.

Figure 7:
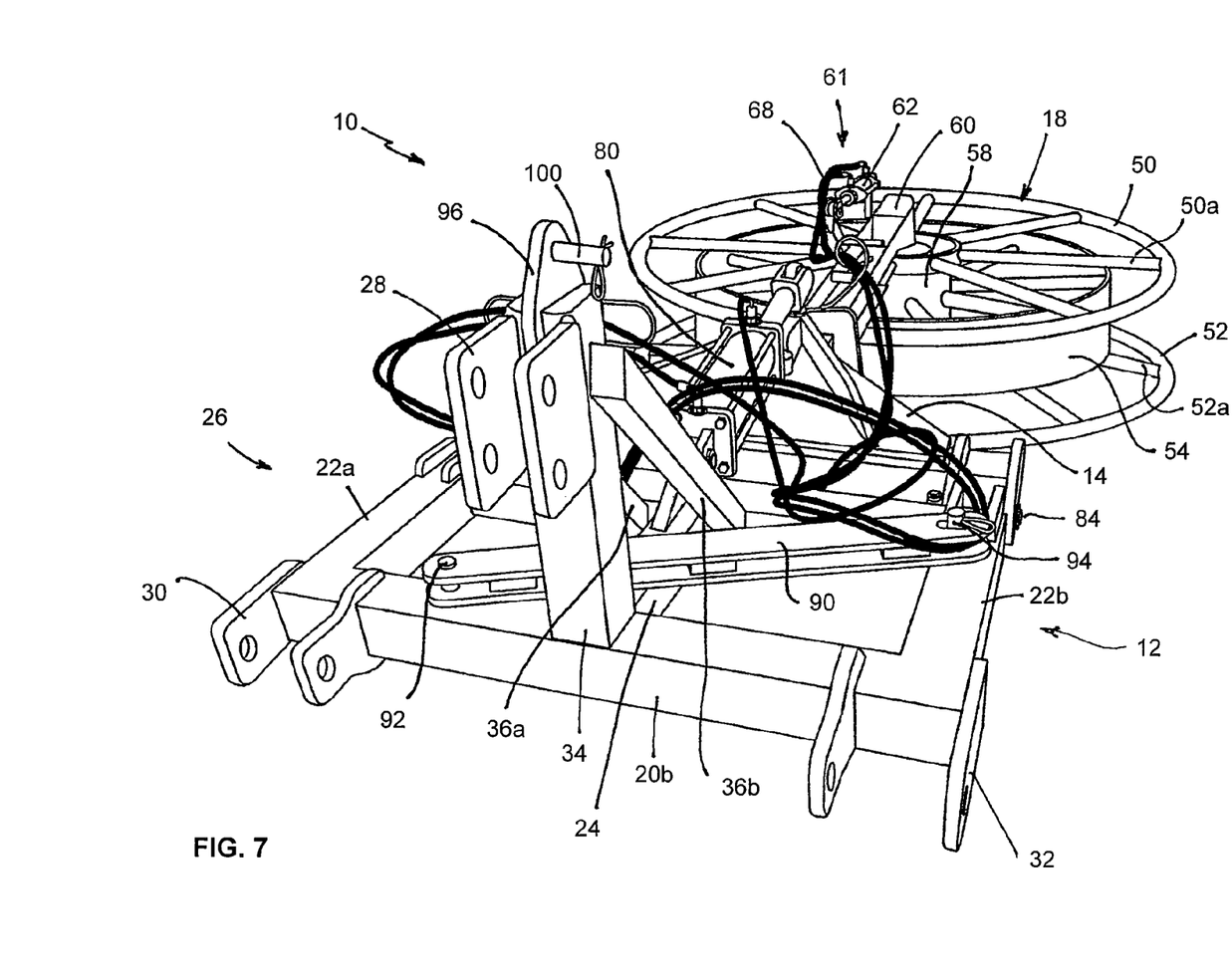
FIG. 7 is an upper perspective view of an aft portion of the inventive sludge distributing hose positioning apparatus.

As particularly shown in the aft upper perspective view of FIG. 7, mounting frame 12 also includes an upright structural member 34 rigidly secured to and extending upward from the forward beam 20b, and a pair of braces 36a and 36b rigidly secured to and extending between the upright structural member 34 and the center beam 24.

Figure 8:
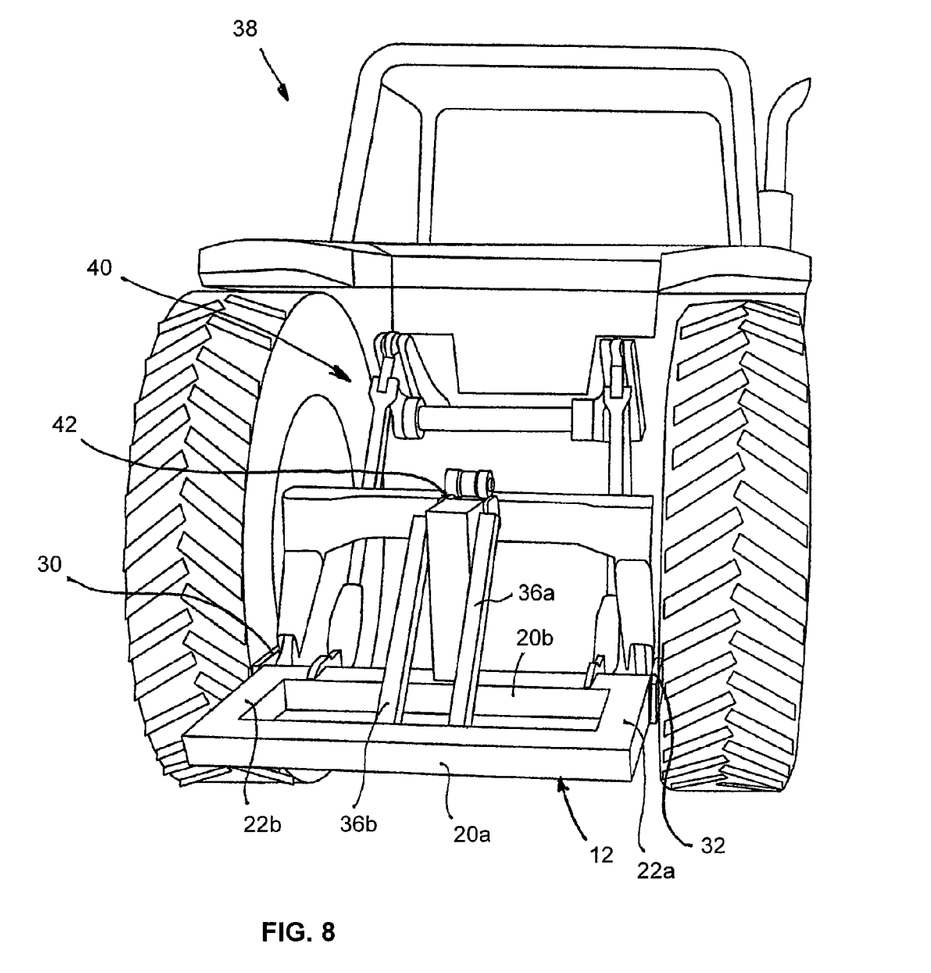
FIG. 8 is an aft perspective view of a conventional tractor illustrating details of its three-point hitch arrangement for coupling to the inventive sludge distributing hose positioning apparatus.
Figure 9:
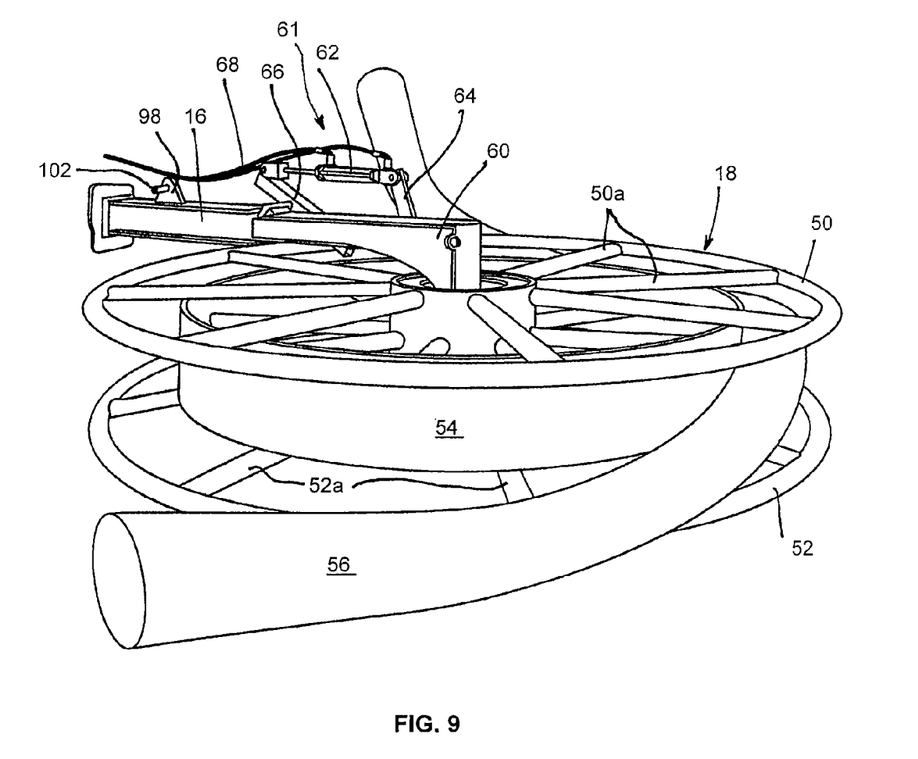
FIG. 9 is an upper, partial perspective view of a front portion of the inventive sludge distributing hose positioning apparatus illustrating details of its hose-engaging, rotatable wheel assembly.
Figure 10:
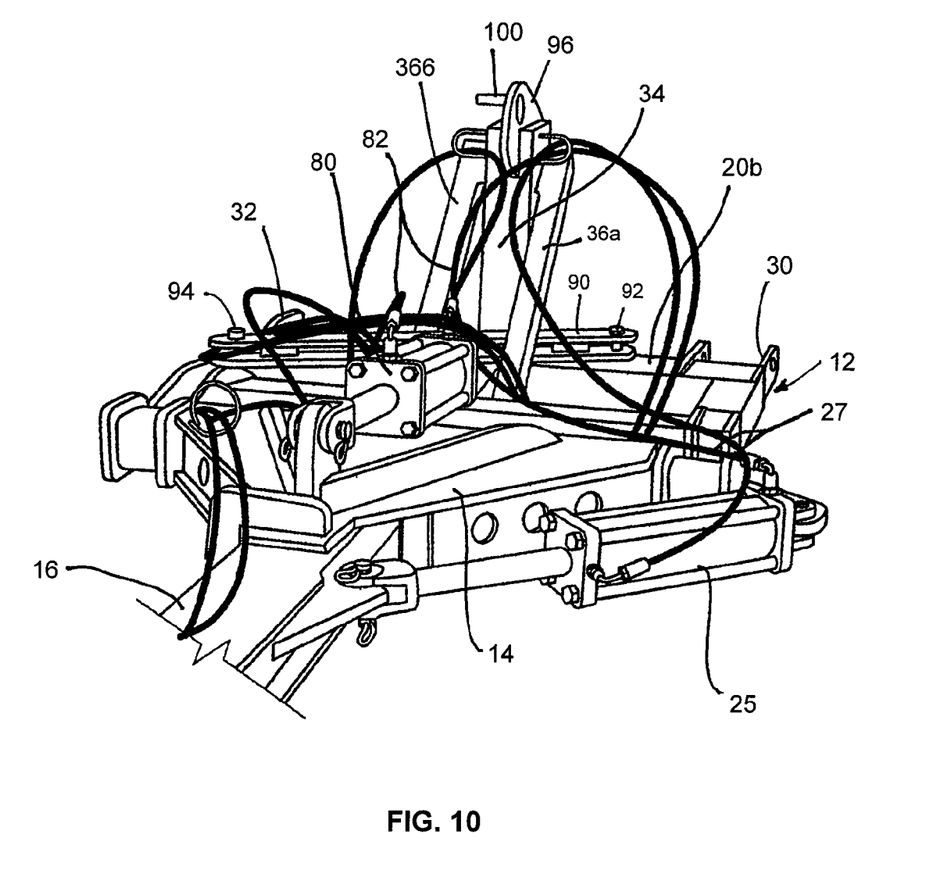
FIG. 10 is an upper perspective view of a rear portion of the inventive sludge distributing hose positioning hose apparatus.
Figure 11:
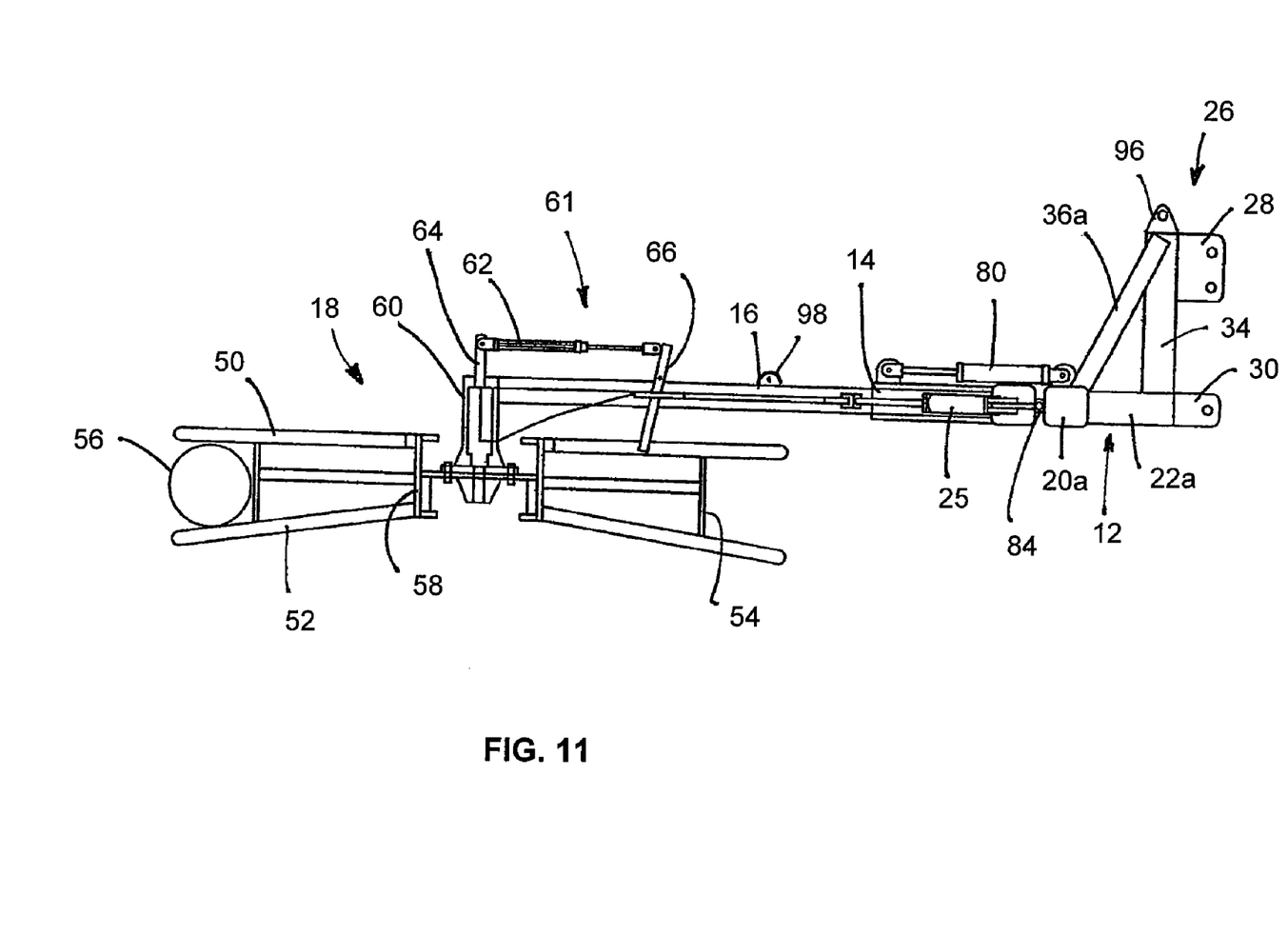
FIGS. 11 and 12 are side elevation views of the inventive sludge distributing hose positioning apparatus respectively illustrating the positioning apparatus in the operating position and in the up raised, transport position.
Figure 12:
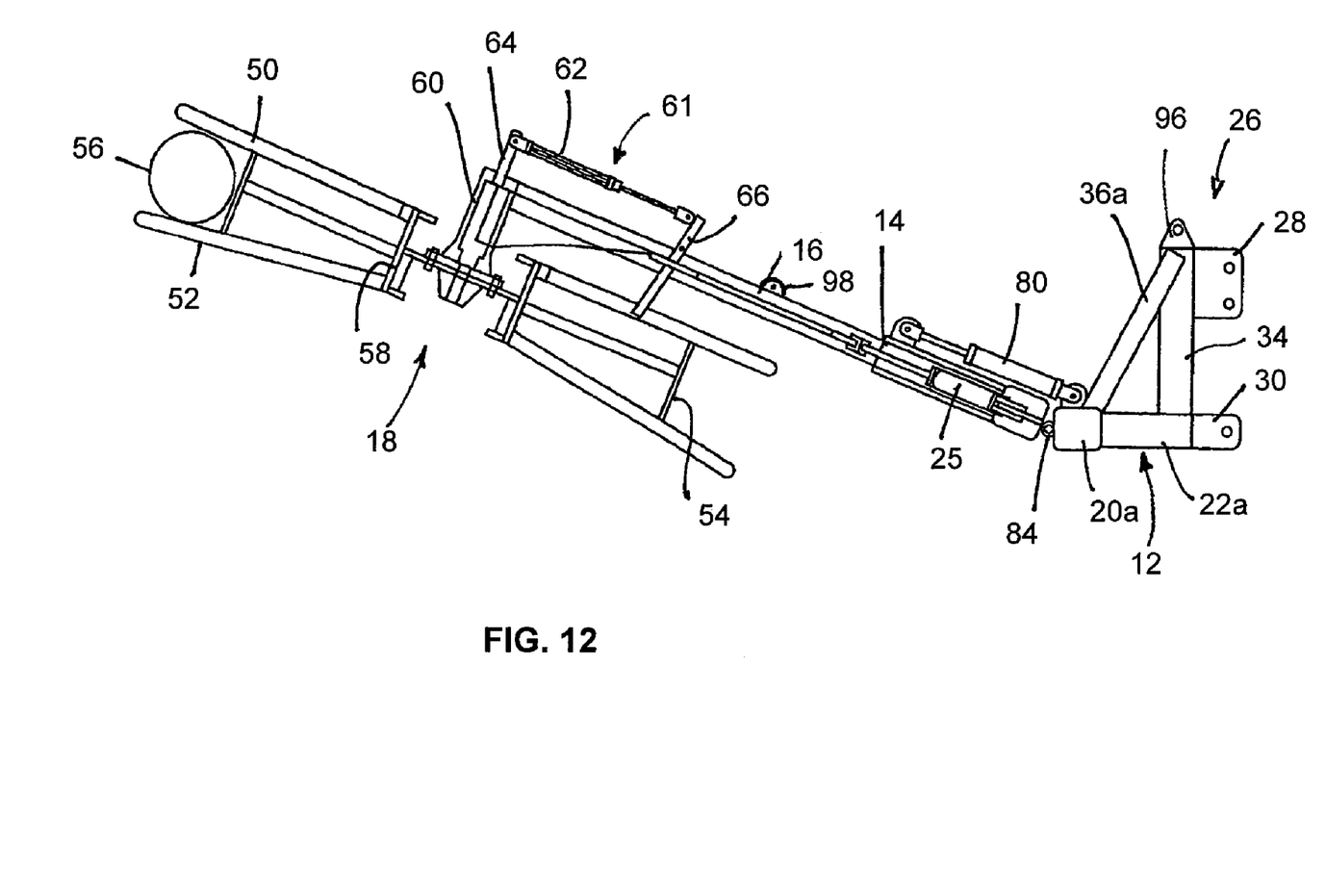

The mounting frame 12 further includes a hitch attachment arrangement 26 for connecting the mounting frame 12 to a hitch 40 on the tractor 38. In the illustrated exemplary embodiment, the hitch attachment arrangement is a three-point hitch attachment arrangement 26 for connecting to a complementarily configured three-point hitch 40 on the tractor 38 as shown in FIG. 8. In other exemplary embodiments, the hitch attachment arrangement 26 may have other configurations for connecting to tractor hitches 40 having other configurations.

The three-point hitch attachment arrangement 26 includes a first connector 28, a second connector 30, and a third connector 32, and the three-point tractor hitch 40 includes three complementary connection points to which the first, second, and third connectors may be removably connected. In the illustrated exemplary embodiment, the first connector 28 is located near a top of the upright structural member 34, the second connector 30 is located near the intersection of the aft beam 20b and the first side beam 22a, and the third connector 32 is located near the intersection of the aft beam and the second side beam 22b. Alternatively, the connectors 28, 30, 32 may be located at different locations on the mounting frame 12 as long as the connectors 28, 30, 32 are appropriately located to connect to the tractor hitch 40.

Referring additionally to FIGS. 9-12, wheel support frame 14 extends from and is rotatably connected to mounting frame 12 via pivot connections 84a and 84b. Although the illustrated exemplary embodiment shows two pivot connections 84a, 84b, the present invention is not limited to this number of connections. Wheel support frame 14 has a generally triangular shape that reduces in width in proceeding away from mounting frame 12. Support arm 16 is rotatably connected to wheel support frame 14 at a first end of the support arm via pivot connection 86 and is rotatably connected to wheel assembly 18 at a second, opposed end.

Wheel assembly 18 includes an upper circular rim 50, a lower circular rim 52, an inner ring member 54, a hub 58, and a wheel mounting member 60. Plural upper radially extending members 50a extend between the upper circular rim 50 and hub 58, and plural lower radially extending members 52a extend between lower circular rim 52 and hub 58 to provide structural rigidity to the wheel assembly 18. Hub 58 is rotatably secured to wheel mounting member 60, which is rigidly secured to support arm 16 to facilitate rotation of the wheel assembly 18 in both clockwise and counterclockwise directions relative to the support arm. Inner ring member 54 provides a surface against which a hose 56 may abut as the hose positioning apparatus 10 is utilized to position the hose. Upper and lower circular rims 50, 52 provide vertical restraint for hose 56 to inhibit the hose from disengaging the wheel assembly 18 during operation.

Hose positioning apparatus 10 further includes a locking assembly 61 for selectively preventing or enabling rotation of wheel assembly 18. Locking assembly 61 includes an actuator or hydraulic cylinder 62, a mounting arm 64 for connecting hydraulic cylinder 62 to support arm 16, and a latch arm 66 connected to the hydraulic cylinder. Latch arm 66 is movable by the hydraulic cylinder 62 between a locking position (see FIGS. 11 and 12), in which the latch arm is disposed in the path of the upper radially extending members 50a of the upper circular rim 50 to prevent rotation of the wheel assembly 18, and an unlocked position (see FIG. 9), in which the latch arm is moved out of the path of the upper radially extending members to allow the wheel assembly to freely rotate. Locking assembly 61 also includes hydraulic hoses 68 to provide the necessary pressurized hydraulic fluid to hydraulic cylinder 62 for operation. In other exemplary embodiments, locking assembly 61 may have other configurations and operate in other manners in order to selectively prevent and enable rotation of the wheel assembly 18.

Support arm 16 and wheel assembly 18 may be rotated about pivot connection 86 relative to wheel support frame 14 via an actuator or hydraulic cylinder 25. Hydraulic hoses 27 provide the necessary pressurized hydraulic fluid to hydraulic cylinder 25 for operation. Hydraulic cylinder 25 is connected to support arm 16 and is capable of moving the support arm and wheel assembly 18 through a continuous range of positions between a straight position (see FIG. 5) and an angularly displaced position (see FIG. 6). Alternatively, the combination of support arm 16 and wheel assembly 18 may be rotationally displaced relative to wheel support frame 14 in other manners and may have their positioning limits other than those illustrated in FIGS. 5 and 6. For example, support arm 16 and wheel assembly 18 may be rotated from its straight position in a direction opposite to the position shown in FIG. 6. In such an instance, rotational displacement limits of support arm 16 and wheel assembly 18 may be the fully-angled position shown in FIG. 6 and a fully-angled position disposed on the other side of the straight position as shown in FIG. 5. It should be further understood that support arm 16 and wheel assembly 18 may be rotated to any position relative to the wheel support frame 14 and still be within the intended spirit and scope of the present invention. The capability to pivotally displace wheel assembly 18 relative to the rest of the hose positioning apparatus 10 provides the operator with substantially greater flexibility in locating and positioning the sludge hose with respect to the tractor.

In the illustrated embodiment, an actuator or hydraulic cylinder 80 rotates the wheel support frame 14, support arm 16, and wheel assembly 18 relative to the mounting frame 12 about the pivot connections 84, although the present invention is not limited to this means of rotational displacement. Hydraulic hoses 82 provide the necessary pressurized hydraulic fluid to the hydraulic cylinder 80 for operation. Hydraulic cylinder 80 is connected at a first end to mounting frame 12 and at a second, opposed end to wheel support frame 14. Depending on the direction of its movement, hydraulic cylinder 80 pushes or pulls wheel support frame 14, support arm 16, and wheel assembly 18 between a substantially horizontal, operating position (see FIG. 11) and an upraised, travel position (see FIG. 12). Alternatively, wheel support frame 14, support arm 16, and wheel assembly 18 may be rotated between the operating and travel positions in other manners all of which are intended to be within the spirit and scope of the present invention. During transport of the hose positioning apparatus 10, it is desirable to maintain the wheel support frame 14, support arm 16, and wheel assembly 18 in the upraised, travel position.

A brace member 90 is used to maintain the wheel support frame 14, support arm 16, and wheel assembly 18 in the upraised position for transport. When in use, brace member 90 is secured at a first end to a first mounting bracket 96 via a first coupling pin 100 and at a second end to a second mounting bracket 98 via a second coupling pin 102. First mounting bracket 96 is positioned on upright structural member 34 and second mounting bracket 98 is positioned on an upper surface of support arm 16. Alternatively, the brace member 90 may have other configurations, may be connected to the hose positioning apparatus 10 in other manners, and may be connected to the hose positioning apparatus 10 in different locations and be within the intended spirit and scope of the present invention.

When the brace member 90 is not in use, it is located in a storage position by attaching it to mounting frame 12. When stored, a first end of the brace member 90 is connected to the aft beam 20b with a first positioning pin 92 and a second end of the brace member is connected to the second side beam 22b with a second positioning pin 94. Alternatively, the brace member 90 may be connected to the hose positioning apparatus 10 in other manners and in other locations in order to position the brace member 90 in a storage position.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention as recited in the following claims.

I claim:

1. Apparatus for engaging and positioning a sludge hose in spreading fertilizer on a field, said apparatus comprising:
   a first frame member adapted for mounting to a vehicle, wherein said first frame member includes three connecting elements for attachment to a three-point tractor hitch;
   a second frame member pivotally coupled to said first frame member;
   a curvilinear rotatable member attached to an intermediate portion of said second frame member and adapted to rotate in the plane of said second frame member and to engage the sludge hose;
   a first displacement mechanism coupled to said first and second frame members for raising said second frame member, said curvilinear rotatable member and the sludge hose above the field; and
   a second displacement mechanism coupled to said second frame member and to said rotatable member for laterally displacing said curvilinear rotatable member for repositioning the sludge hose.

2. The apparatus of claim 1, further comprising at least one first pivot connection coupling said first and second frame members.

3. The apparatus of claim 1, wherein said first displacement mechanism is a first hydraulic cylinder.

4. The apparatus of claim 1 further comprising a second pivot connection coupling said second frame member and said curvilinear rotatable member.

5. The apparatus of claim 4 further comprising an elongated structural member coupling said curvilinear rotatable member to said second frame member via said second pivot connection.

6. The apparatus of claim 5 further comprising a third pivoting connection coupling said curvilinear rotatable member to said elongated structural member.

7. The apparatus of claim 1, wherein said curvilinear rotatable member is generally circular in shape.

8. The apparatus of claim 7, wherein said curvilinear rotatable member includes an upper circular member and a lower circular member connected by means of a central hub.

9. The apparatus of claim 8, wherein said curvilinear rotatable member further includes an inner ring member disposed between and attached to said upper and lower circular members and positioned between said central hub and outer peripheries of said upper and lower circular members.

10. The apparatus of claim 9, wherein a portion of a sludge hose engaged by said curvilinear rotatable member is positioned between said upper and lower circular members and in contact with a portion of said inner ring member.

11. The apparatus of claim 1 further comprising a movable stop member adapted for engaging said curvilinear rotatable member and preventing rotation thereof.

12. The apparatus of claim 11, wherein each of said upper and lower circular members includes respective plural spaced radial members extending outwardly from said central hub to an outer periphery of said upper and lower circular members, and wherein said movable stop member is positioned between adjacent radial members of at least one of said upper and lower circular members to prevent rotation of said curvilinear rotatable member.

13. The apparatus of claim 12 further comprising an elongated structural member pivotally coupling said curvilinear rotatable member to said second frame member, wherein said movable stop member is attached to said elongated structural member.

14. The apparatus of claim 13, wherein said moveable stop member includes a latch arm pivotably attached to said elongated structural member and a hydraulic cylinder connected to said latch arm for moving said latch arm between a locked position, wherein said latch arm engages an upper or lower circular member, and an unlocked position, where said latch arm does not engage an upper or lower circular member.

15. The apparatus of claim 1, further comprising a brace member removably coupled to said first frame member and to said second frame member for maintaining said first and second frame members in fixed relative position to one another during transport of the apparatus.

16. The apparatus of claim 1, wherein said second displacement mechanism laterally displaces said curvilinear rotatable member over an angle on the order of 55°.

17. The apparatus of claim 1, wherein said second displacement mechanism laterally displaces said curvilinear rotatable member on the order of 16 feet relative to a line of travel of a tractor.

* * * * *